United States Patent
Tozawa

(10) Patent No.: US 9,426,396 B2
(45) Date of Patent: Aug. 23, 2016

(54) IMAGE SENSOR, IMAGE CAPTURING APPARATUS, AND CELLULAR PHONE FOR REDUCED POWER CONSUMPTION WHEN PERFORMING THINNING READOUT

(71) Applicant: CANON KABUSHIKI KAISHA, Tokyo (JP)

(72) Inventor: Shohei Tozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/555,045

(22) Filed: Nov. 26, 2014

(65) Prior Publication Data
US 2015/0156432 A1  Jun. 4, 2015

(30) Foreign Application Priority Data

Dec. 2, 2013  (JP) ................................. 2013-249626
Oct. 31, 2014  (JP) ................................. 2014-223195

(51) Int. Cl.
*H04N 5/378*  (2011.01)
*H04N 5/345*  (2011.01)
*H04N 5/369*  (2011.01)

(52) U.S. Cl.
CPC .......... *H04N 5/3698* (2013.01); *H04N 5/3456* (2013.01); *H04N 5/3458* (2013.01); *H04N 5/378* (2013.01)

(58) Field of Classification Search
CPC ............. H04N 5/3698; H04N 5/3456; H04N 5/3458; H04N 5/378
USPC ........................................................ 348/302
See application file for complete search history.

(56) References Cited

U.S. PATENT DOCUMENTS

| | | | | |
|---|---|---|---|---|
| 2006/0266923 | A1* | 11/2006 | Mabuchi | H04N 5/3532 250/208.1 |
| 2008/0252762 | A1* | 10/2008 | Iwamoto | H04N 5/35518 348/301 |
| 2011/0089492 | A1* | 4/2011 | Yilmaz | H01L 29/0634 257/343 |
| 2011/0095169 | A1* | 4/2011 | Takenaka | H04N 5/3658 250/208.1 |
| 2012/0268633 | A1* | 10/2012 | Sambonsugi | H04N 5/343 348/300 |

FOREIGN PATENT DOCUMENTS

JP  09-247689 A  9/1997

* cited by examiner

*Primary Examiner* — Gevell Selby
(74) *Attorney, Agent, or Firm* — Cowan, Liebowitz & Latman, P.C.

(57) ABSTRACT

An image sensor comprises: a plurality of pixels including a first pixel group and a second pixel group; a first readout unit connected to the first pixel group; a second readout unit connected to the second pixel group; and a control unit configured to control to supply power to the first and second readout units in a first readout mode, and supply power to the first readout unit and not to supply power to the second readout unit in a second readout mode, wherein the plurality of pixels and the first readout unit are arranged on a first chip, and the second readout unit is arranged on a second chip.

10 Claims, 7 Drawing Sheets

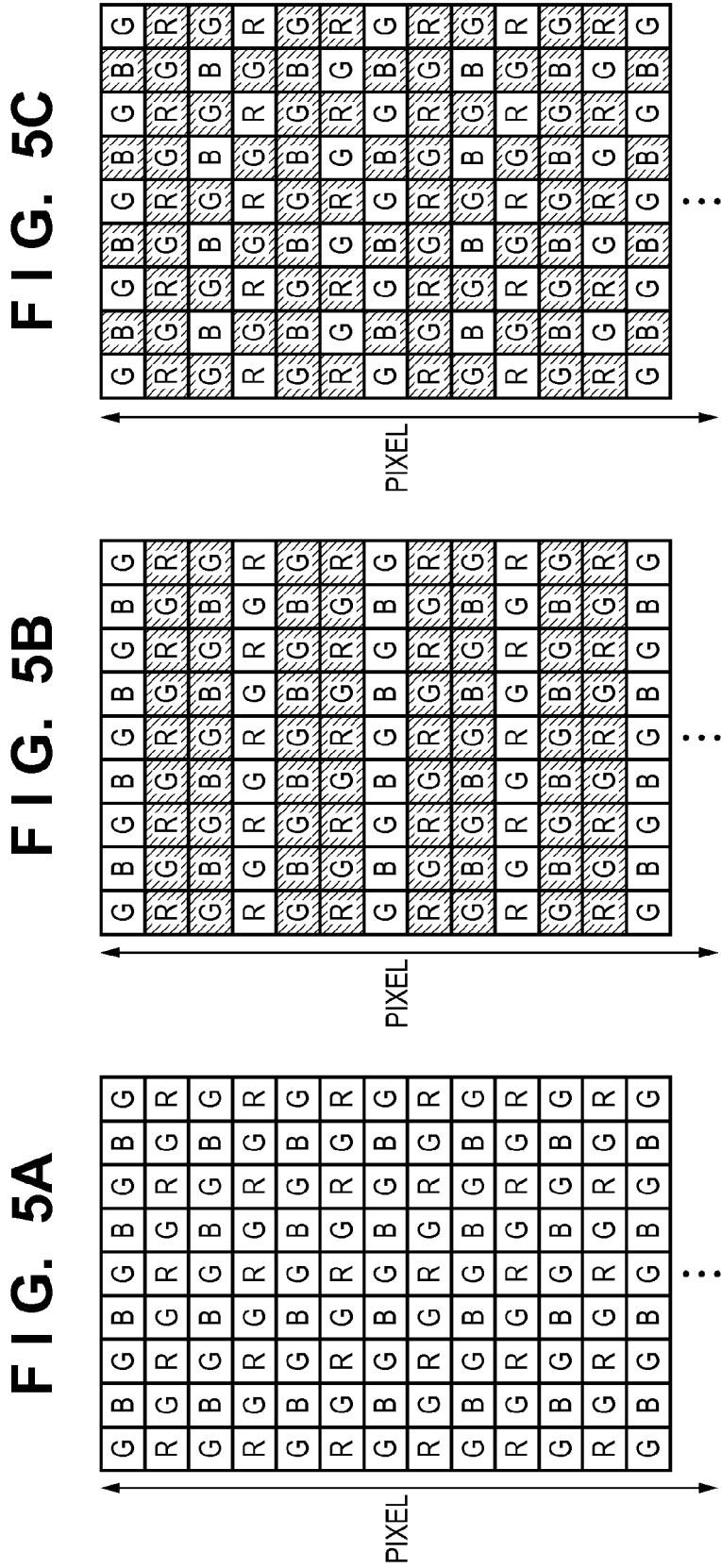

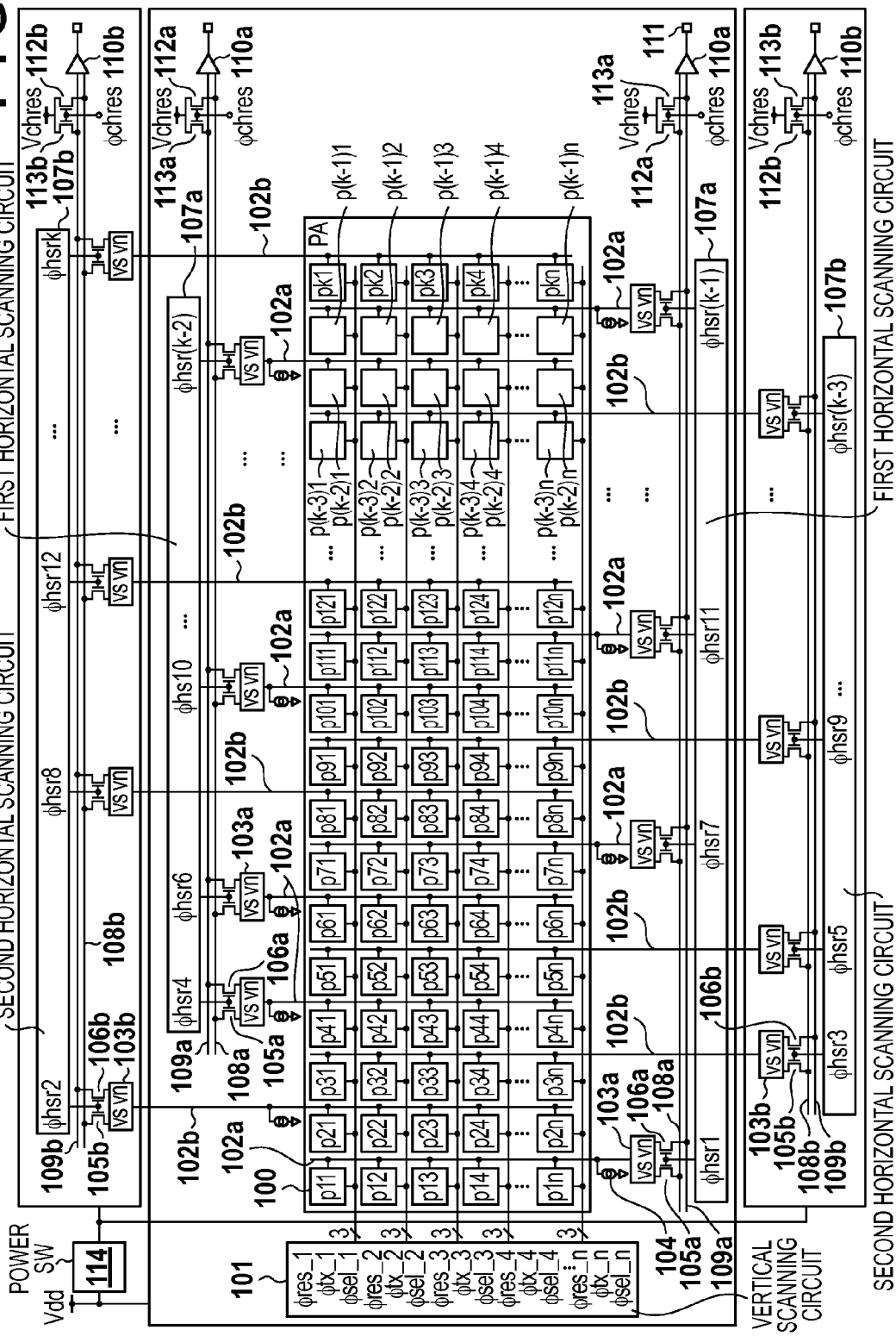

IMAGE SENSOR, IMAGE CAPTURING APPARATUS, AND CELLULAR PHONE FOR REDUCED POWER CONSUMPTION WHEN PERFORMING THINNING READOUT

BACKGROUND OF THE INVENTION

1. Field of the Invention

The present invention relates to an image sensor, and an image capturing apparatus and a cellular phone using the image sensor.

2. Description of the Related Art

Conventionally, many types of image capturing apparatuses, such as digital cameras and video cameras, using image sensors represented by a CCD and CMOS sensor have been developed, and the number of pixels of the image sensor has been increased in order to obtain a high definition image.

In these image capturing apparatuses, since all the pixels are read out from the image sensor in a still image shooting, a high resolution image can be obtained. On the other hand, it takes time to read out image data from all the pixels of the image sensor, and a frame rate decreases. Moreover, power consumption increases if all the pixels are read out at high speed.

In order to solve the above problem, Japanese Patent Laid-Open No. 09-247689 discloses an image capturing apparatus that takes 4×4 pixels as one unit, and signals of the same color are thinned out and added.

However, according to the technique disclosed in Japanese Patent Laid-Open No. 09-247689, power consumption is reduced by performing thinning readout, but there is no consideration about power consumed by a readout circuit for pixels which are not read out.

SUMMARY OF THE INVENTION

The present invention has been made in consideration of the above situation, and further reduces power consumption of an image sensor when performing thinning readout.

According to the present invention, provided is an image sensor comprising: a plurality of pixels including a first pixel group and a second pixel group; a first readout unit connected to the first pixel group; a second readout unit connected to the second pixel group; and a control unit configured to control to supply power to the first and second readout units in a first readout mode, and control to supply power to the first readout unit and not to supply power to the second readout unit in a second readout mode, wherein the plurality of pixels and the first readout unit are arranged on a first chip, and the second readout unit is arranged on a second chip.

Further, according to the present invention, provided is an image sensor comprising: a plurality of pixels; a first readout unit configured to read out pixel signals from part of the plurality of pixels; and a second readout unit configured to read out pixel signals from different part of the plurality of pixels, wherein pixels to be readout during thinning readout in which part of the plurality of pixels are thinned out and a rest of the plurality of pixels are read out are connected to the first readout unit, and at least part of the pixels to be thinned out during the thinning readout are connected to the second readout unit, and power supply to the second readout unit is stopped during thinning readout.

Furthermore, according to the present invention, provided is an image capturing apparatus comprising the image sensor defined as above.

Further, according to the present invention, provided is a cellular phone comprising the image sensor defined as above.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A to 5C are conceptual views for explaining readout methods of the image sensor according to the first embodiment.

FIG. 6 is a diagram illustrating an overall configuration of an image sensor according to a second embodiment of the present invention.

FIGS. 7A to 7C are conceptual views for explaining readout methods of the image sensor according to the second embodiment.

DESCRIPTION OF THE EMBODIMENTS

Exemplary embodiments of the present invention will be described in detail in accordance with the accompanying drawings.

First Embodiment

Figure 1:
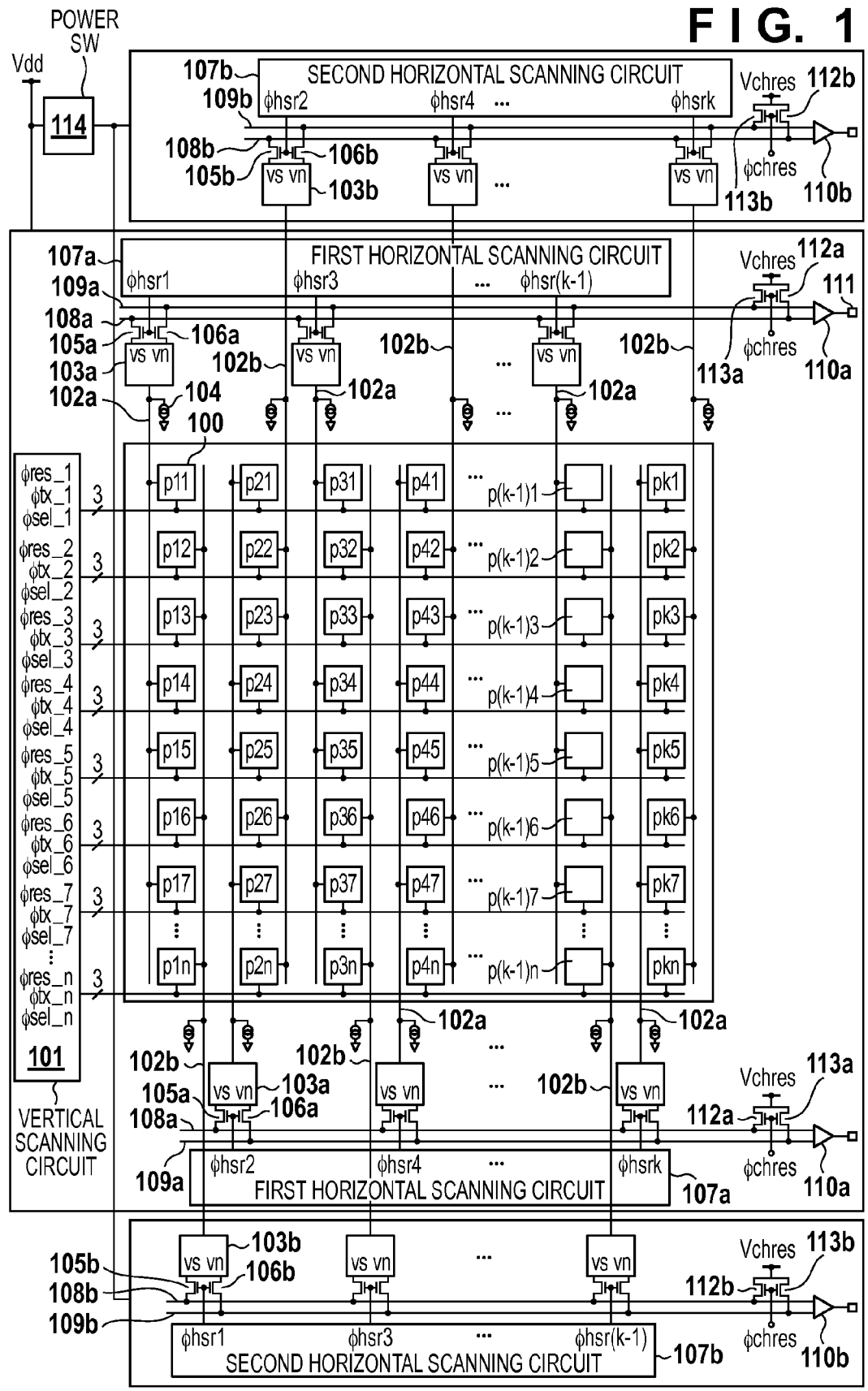
FIG. 1 is a diagram illustrating an overall configuration of an image sensor according to a first embodiment of the present invention.

FIG. 1 is a diagram illustrating an overall view of an image sensor used in image capturing apparatuses, such as digital still cameras and digital video cameras, according to a first embodiment of the present invention. In a pixel region 100, a plurality of pixels p are arranged in matrix. In FIG. 1, pixels are denoted by p11 to pkn, the row number being indicated by 1 to n, and the column number being indicated by 1 to k.

Figure 2:
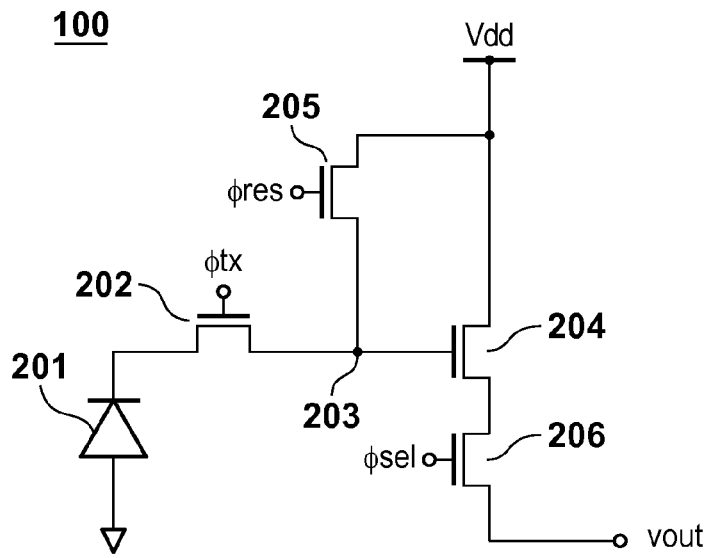
FIG. 2 is a circuit diagram of a pixel.

A configuration of a pixel p is explained with reference to FIG. 2. A photodiode (PD) 201 photoelectrically converts incident light, and accumulates the generated charge corresponding to a quantity of the incident light. The charge accumulated in the PD 201 is transferred to a floating diffusion (FD) portion 203 by turning on a transfer gate 202 by controlling a signal Φtx to a high level. The FD portion 203 is connected to a gate of an amplifier 204. The amplifier 204 converts the charge transferred from the PD 201 to a voltage corresponding to the amount of charge. Then, a signal Φsel for controlling a pixel selection switch 206 is turned to the high level, thereby a pixel signal converted to the voltage by the amplifier 204 is output as an output vout of the pixel p.

Further, by controlling a signal Φres to the high level, a reset switch 205 is turned on, thereby the FD portion 203 can be reset. Further, by controlling the signals Φtx and Φres to the high level simultaneously, the transfer gate 202 and the reset switch 205 are simultaneously turned on, and the PD 201 can be reset via the FD portion 203.

Referring to FIG. 1 again, a vertical scanning circuit 101 provides driving signals Φres, Φtx, Φsel, and so forth to the reset switch 205, the transfer gate 202, the pixel selection switch 206 of each pixel via horizontal signal lines. In FIG. 1, pixels arranged in the same row are connected to the same horizontal signal lines, and signals output to the horizontal signal lines of each of the first to n-th rows are shown as signals Φres_1~n, Φtx_1~n, and Φsel_1~n.

An output vout from each pixel p is read out under the control of the vertical scanning circuit 101 in units of row, and output to a first column readout circuit 103a or a second column readout circuit 103b provided for each column via a first vertical output line (column output line) 102a or a second vertical output line (column output line) 102b.

Figure 3:
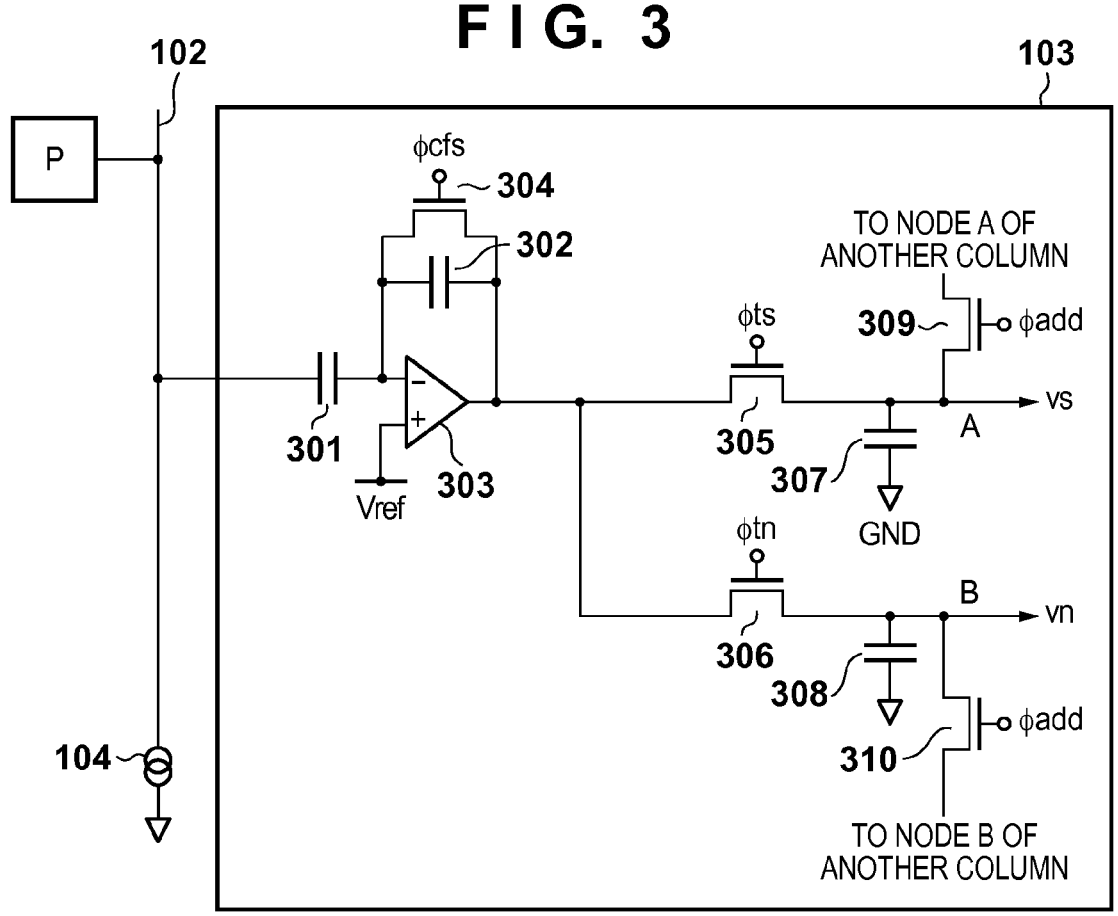
FIG. 3 is a circuit diagram of a readout circuit provided for each column of the image sensor.

Here, a configuration of the first column readout circuit 103a and the second column readout circuit 103b is explained with reference to FIG. 3. Note, since the first column readout circuit 103a and the second column readout circuit 103b have the same structure, they are referred to as the column readout circuit 103 in FIG. 3 and its explanation. Similarly, the first vertical output line 102a and the second vertical output line 102b are referred to as the vertical output line 102.

The vertical output line 102 is arranged for each column, and an output vout from a pixel p connected to the vertical output line 102 is output. A current source 104 is connected to the vertical output line 102, and the current source 104 and the amplifier 204 of the pixel p connected to the vertical output line 102 constitute a source follower circuit.

A pixel signal output to the vertical output line 102 is inputted to an inverting input terminal of an operational amplifier 303 via a clamp capacitor 301. A reference voltage Vref is applied to a non-inverting input terminal of the operational amplifier 303. A switch 304 is used to short between the ends of a feed back capacitor 302, and controlled by the signal Φcfs.

An S signal transfer switch 305 is used for transferring a pixel signal S read out from the pixel p to an S signal capacitor 307. When a signal Φts is turned to the high level, the pixel signal S, which is amplified by the operational amplifier 303, is stored in the S signal capacitor 307 via the S signal transfer switch 305.

An N signal transfer switch 306 is used for transferring a noise signal N to an N signal capacitor 308. When a signal Φtn is turned to the high level, the noise signal N amplified by the operational amplifier 303 is stored in the N signal capacitor 308 via the N signal transfer switch 306. The pixel signal S and the noise signal N stored in the S signal capacitor 307 and the N signal capacitor 308, respectively, are output from output terminals vs and vs of the column readout circuit 103.

In the example shown in FIG. 1 and explained in the first embodiment, the outputs vout from the pixels p arranged in the first, fourth, fifth, and seventh rows among pixels arranged in the pixel region 100 are read out to either of the two first column readout circuits 103a arranged on the top and bottom ends of the pixel region 100 via the first vertical output lines 102a. Hereinafter, a processing system that reads out signals to the first column readout circuits 103a via the first vertical output lines 102a and processes the read signals is referred to as a "first system". On the other hand, the outputs vout from the pixels p arranged in the second, third, and sixth lines are read out to either of the two second column readout circuits 103b arranged on the top and bottom ends of the pixel region 100 via the second vertical output lines 102a. Hereinafter, a processing system that reads out signals to the second column readout circuits 103b via the second vertical output lines 102b and processes the read signals is referred to as a "second system". In FIG. 1, "a" is appended to reference numerals of the constituents of the first system, and "b" is appended to reference numerals of the constituents of the second system. The pixels p are connected to the first vertical output lines 102a and the second vertical output lines 102b so that the outputs from the pixels are input to either of the first and second systems by repeating a pattern of 6 rows in the vertical direction, namely, the first row of the 6 rows are connected to the first system, the second row to the second system, the third row to the second system, the fourth row to the first system, the fifth row to the first system, and the sixth row to the second system, until the n-th row.

In the first system, the output terminals vs and vn of the first column readout circuit 103a are connected to horizontal transfer switches 105a and 106a, respectively controlled by a control signal Φhsri (i indicates the column number, i=1~k) from the first horizontal scanning circuit 107a. When the control signal Φhsri becomes the high level, the horizontal transfer switches 105a and 106a transfer the pixel signal S and noise signal N held in the S signal capacitor 307 and the N signal capacitor 308 to the horizontal output lines 108a and 109a, respectively.

The horizontal output lines 108a and 109a are connected to the inputs of operational amplifiers 110a. The operational amplifiers 110a take differences between the pixel signals S and the noise signals N as well as applies a predetermined gain to the differences, and output resultant image signals to an output terminals 111.

Horizontal output line reset switches 112a and 113a are turned on by controlling the signal Φchres to the high level, thereby the horizontal output lines 108a and 109a are reset to a reset voltage Vchres.

The second system has the same configuration as that of the first system, therefore, the explanation of it is omitted.

Figure 4A:
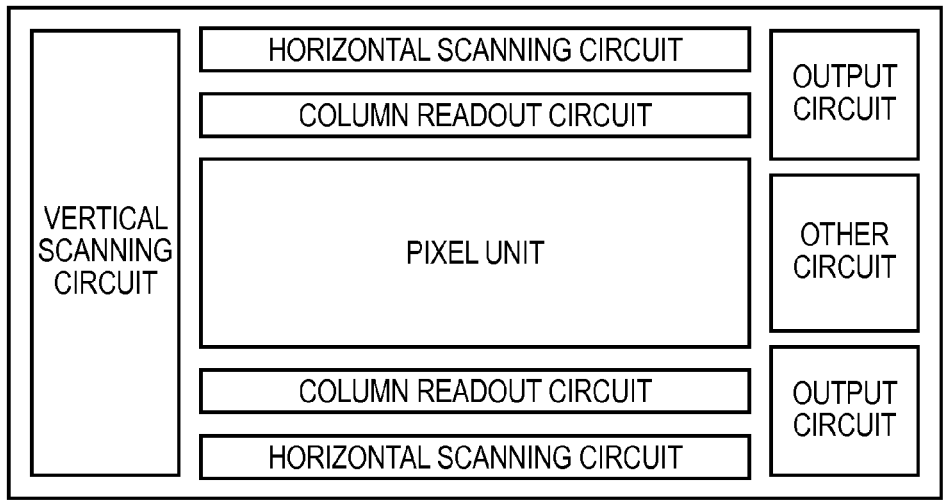
FIGS. 4A to 4C are conceptual views illustrating chip configuration of the image sensor according an embodiment.

Next, a structure of the image sensor according to the first embodiment will be explained with reference to FIGS. 4A to 4C. FIG. 4A shows a conventional image sensor of one-chip structure. As shown in FIG. 4A, a pixel region, a vertical scanning circuit, a column readout circuit, a horizontal scanning circuit, an output circuit, and other circuits are arranged on one chip.

Figure 4B:
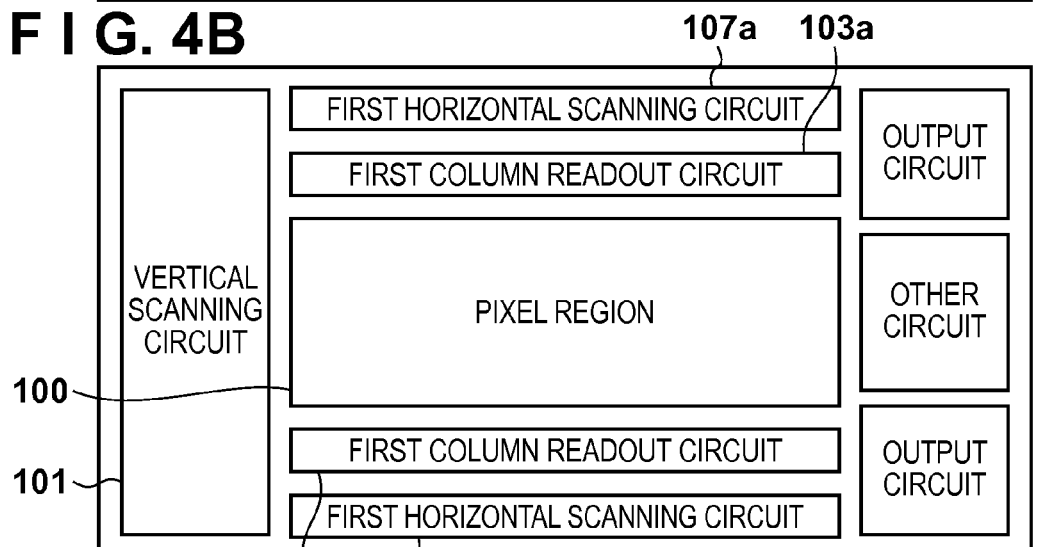
Figure 4C:
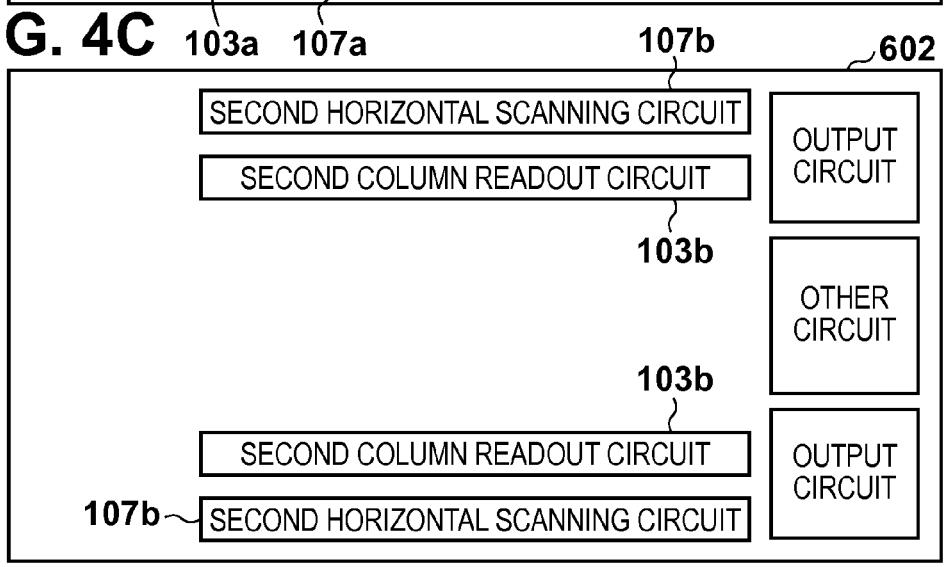

By contrast, the image sensor according to the first embodiment has a two-chip structure in which a first chip and a second chip are stacked as shown in FIGS. 4B and 4C. FIG. 4B shows the first chip, and FIG. 4C shows the second chip. On the first chip, the pixel region 100, the vertical scanning circuit 101, and output circuits including the first column readout circuits 103a, the first horizontal scanning circuits 107a, the operational amplifiers 110a, and so forth, of the first system are formed. On the other hand, output circuits including the second column readout circuits 103b, the second horizontal scanning circuits 107b, and the operational amplifiers 110b of the second system and other circuits are formed on the second chip. By arranging the processing circuitry of the first system and the processing circuitry of the second system separately on the two stacked chips as shown in FIGS. 4B and 4C, it is possible to form the image sensor having the structure as shown in FIG. 1 in the same area as that of the conventional image sensor.

A power SW 114 shown in FIG. 1 is used to turning on or off the power supply to the processing circuitry of the second system, such as the second column readout circuits 103b, the second horizontal scanning circuits 107b, and so forth, arranged on the second chip.

Next, a readout method of pixel signals from the image sensor having the above configuration according to the first embodiment will be explained with reference to FIGS. 5A to 5C.

In a case where signals are read out from all of the pixels of the image sensor as shown in FIG. 5A, both of the first system and the second system are used. By using both of the first system and the second system, it is possible to read out signals in units of two rows, such as signals of the first and second rows, signals of the third and fourth rows, and so forth. Further, processing circuits of the first and second systems are provided on the top and bottom ends of the pixel region 100, signals can be read out in units of two columns, such as signals of the first and second columns, signals of the third and fourth columns, and so forth. Accordingly, it is possible to greatly shorten a time taken for reading out the signals.

FIG. 5B shows a thinning readout method in a case where ⅓ of pixels are read out in the vertical direction (vertical ⅓ thinning readout) as an example of the thinning readout method of reading pixels while thinning part of pixels p. In FIG. 5B, white pixels indicate pixels to be readout, and hatched pixels indicate pixels not to be read out. In the vertical ⅓ thinning readout, if signals are read out from the pixels in the first row in the vertical direction, then signals are not read out from the pixels in the second and third rows. Similarly, after signals are read out from the pixels in the fourth row, then signals are not read out from the pixels in the fifth and sixth rows. This thinning readout in the vertical direction is repeated.

At this time, as shown in FIG. 1 in the first embodiment, the pixels of rows which are to be read out in the vertical ⅓ thinning readout, namely, the pixels p11 to pk1 in the first row, the pixels p14 to pk4 in the fourth row, and the pixels p17 to pk7 in the seventh row, are commonly connected to the first system. On the other hand, the pixels of rows which are to be thinned out in the vertical ⅓ thinning readout, namely, the pixels p12 to pk2 in the second row, the pixels p13 to pk3 in the third row, and the pixels p16 to pk6 in the sixth row, are commonly connected to the second system.

Since the second column readout circuits 103b and the second horizontal scanning circuits 107b of the second system are arranged on the second chip, it is possible to reduce power consumption of the image sensor by turning off the power switch 114 to stop supplying power to the second chip when the image sensor is operated in the vertical thinning readout method. Further, by turning off the current sources 104 connected to the second vertical output lines 102b of the second system, it is possible to further reduce power consumption of the image sensor when the image sensor is operated in the vertical thinning readout method.

Note that the signals of the pixels p15 to pk5 in the fifth row which are to be thinned out can be read out via the first system, but the vertical scanning circuit 101 may control so as not to select the fifth row, or the read signals of the fifth row may be discarded. Further, it is possible to equalize the time to read all the signals via the first system and the second system by connecting the pixels p15 to pk5 in the fifth row to the first system; however, the pixels p15 to pk5 may be connected to the second system.

Furthermore, in the first embodiment, whether signals are read or not read from the pixels arranged in a given row is determined for all the columns as shown in FIG. 5B, however, the present invention is not limited to this. For example, by connecting the pixels of the G/R columns to one of the first system and the second system, and connecting the pixels of the B/G column to the other as shown in FIG. 5C, it is possible to arbitrarily set the pixels from which signals are read and the pixels from which signals are not read.

Further, a configuration capable of performing the vertical ⅓ thinning readout is explained in the above example, however, the present invention is not limited to this. The image sensor may be designed so that at least pixels from which signals are to be read out during thinning readout are read out via the first system.

According to the first embodiment as described above, by connecting pixels from which signals are not read out during thinning readout to the second system that is arranged on the second chip, it is possible to turn off the power supply to the second chip during thinning readout. By configuring the image sensor with the two-chip structure, it is possible to turn off the power supply by the chip during thinning readout, thereby reducing the power consumption with a simple power control.

Second Embodiment

The configuration of the image sensor which performs thinning readout in the vertical direction is explained in the first embodiment as described above, however, the direction of thinning is not limited to the vertical direction. Accordingly, in the second embodiment, a configuration for reducing power consumption of an image sensor during thinning readout in the horizontal direction will be explained.

FIG. 6 shows a configuration of an image sensor according to the second embodiment. Each circuit which constitutes the image sensor shown in FIG. 6 is the same as that shown in FIG. 1, therefore, the same reference numeral is assigned and explanation of it is omitted, however, the connection between each circuit differs from that shown in FIG. 1. Below, the connection between the pixels p, the first vertical output lines 102a, the second vertical output lines 102b, the first column readout circuits 103a and the second column readout circuits 103b, the first horizontal scanning circuits 107a and the second horizontal scanning circuits 107b will be described.

In the configuration of the image sensor shown in FIG. 6, the pixels p of each column are connected to the first vertical output line 102a and the first column readout circuit 103a, or the second vertical output line 102b and the second column readout circuit 103b. More specifically, one of the first system or the second system is connected to the pixels of each column.

In the example according to the second embodiment as shown in FIG. 6, among pixels arranged in the pixel region 100, output vout from the pixels p arranged in the first, fourth, sixth, seventh, tenth, and eleventh columns are read out via the first vertical output lines 102a to either of the two first column readout circuits 103a that are arranged on the top and bottom ends of the pixel region 100. Further, output vout from the pixels p arranged in the second, third, fifth, eighth, ninth, and twelfth columns are read out via the second vertical output lines 102b to either of the two second column readout circuits 103b that are arranged on the top and bottom ends of the pixel region 100. Namely, the pixels p are connected to the first vertical output lines 102a and the second vertical output lines 102b so that the outputs from the pixels are input to either of the first and second system by repeating a pattern of 12 columns in the horizontal direction, namely, the first column of the 12 columns are connected to the first system, the second column to the second system, the third column to the second system, the fourth column to the first system, the fifth column to the second system, the sixth column to the first system, the seventh column to the first system, the eighth column to the second system, the ninth column to the second system, the tenth column to the first system, the eleventh column to the first system, and the twelfth column to the second system, until the k-th column.

Next, a readout method of pixel signals from the image sensor having the above configuration according to the second embodiment will be explained with reference to FIGS. 7A to 7C.

Figures 7A, 7B, 7C:
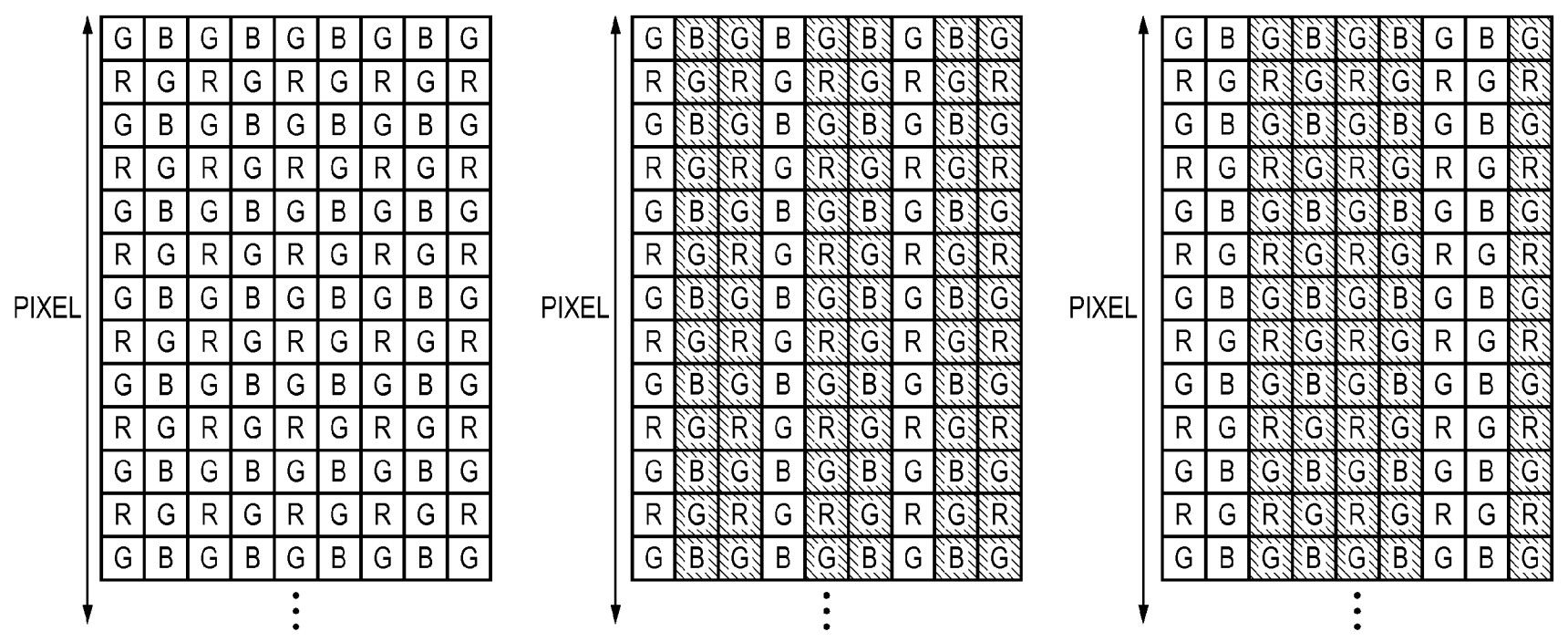

As shown in FIG. 7A, upon reading signals from all the pixels of the image sensor, both of the first system and the second system are used. At this time, by using both of the first system and the second system, it is possible to simultaneously read out pixel signals in units of two columns, such as pixel signals of the first column and the second column, pixel signals of the third column and the fourth column, and so forth. Thus, it is possible to shorten a time taken for reading out the pixel signals.

FIG. 7B shows a thinning readout method in a case where ⅓ of pixels are read out in the horizontal direction (horizontal ⅓ thinning readout). In FIG. 7B, white pixels indicate pixels to be read out, and hatched pixels indicate pixels not to be read out. In the horizontal ⅓ thinning readout, if signals are read out from the pixels in the first column in the horizontal direction, then signals are not read out from the pixels in the second and third columns. Similarly, if signals are read out from the pixels in the fourth column, then signals are not read out from the pixels in the fifth and sixth columns. Further, if signals are read out from the pixels in the seventh column, then signals are not read out from the pixels in the eighth and ninth columns, and if signals are read out from the pixels in the tenth column, then signals are not read out from the pixels in the eleventh and twelfth columns. This thinning readout in the horizontal direction is repeated.

At this time, as shown in FIG. 6 in the second embodiment, the pixels of columns which are to be read out in the horizontal ⅓ thinning readout, namely, the pixels p11 to p1n in the first column, the pixels p41 to p4n in the fourth column, the pixels p71 to p7n in the seventh column, and the pixels p101 to p10n in the tenth column, are commonly connected to the first system. On the other hand, the pixels of columns which are to be thinned out in the horizontal ⅓ thinning readout, namely, the pixels p21 to p2n in the second column, the pixels p31 to p3n in the third column, the pixels p51 to p5n in the fifth column, the pixels p81 to p8n in the eighth column, the pixels p91 to p9n in the ninth column, and the pixels p121 to p12n in the twelfth column, are commonly connected to the second system.

Since the second column readout circuits 103b and the second horizontal scanning circuits 107b of the second system are arranged on the second chip, it is possible to reduce power consumption of the image sensor by turning off the power switch 114 to stop supplying power to the second chip when the image sensor is operated in the horizontal thinning readout method. Further, by turning off the current sources 104 connected to the second vertical output lines 102b of the second system, it is possible to further reduce power consumption of the image sensor when the image sensor is operated in the horizontal thinning readout method.

Note that the signals of the pixels p61 to p6n in the sixth column and the signals of the pixels 111 to p11n which are to be thinned out can be read out via the first system, but the read signals may be discarded. Further, it is possible to equalize the time to read all the signals via the first system and the second system by reading out signals from the pixels p61 to p6n in the sixth column and the pixels 111 to p11n in the eleventh column via the first system; however, wiring are designed so that those signals may be read out via the second system.

Note that in the example shown in FIG. 7B, the configuration for reading out one column, then thinning out two columns is explained; however, the present invention is not limited to this. For example, as shown in FIG. 7C, signals may be read out from two consecutive columns, then signals from pixels in four consecutive columns are thinned out. Namely, the image sensor may be configured such that pixels in the columns from which signals are read out during thinning read out are connected to the first system.

According to the second embodiment as described above, it is possible to achieve the same effects as in the first embodiment at the time of horizontal thinning readout.

Note, it is explained in the first and second embodiments that the number of pixels connected to the first chip is the same as the number of pixels connected to the second chip; however, the number of pixels connected to the first chip and the number of pixels connected to the second chip may be different from each other. By connecting all the pixels to be thinned out to the second system arranged on the second chip, it is possible to further reduce power consumption when the number of the pixels to be thinned out is larger than the number of the pixels to be read out.

Third Embodiment

Figure 8:
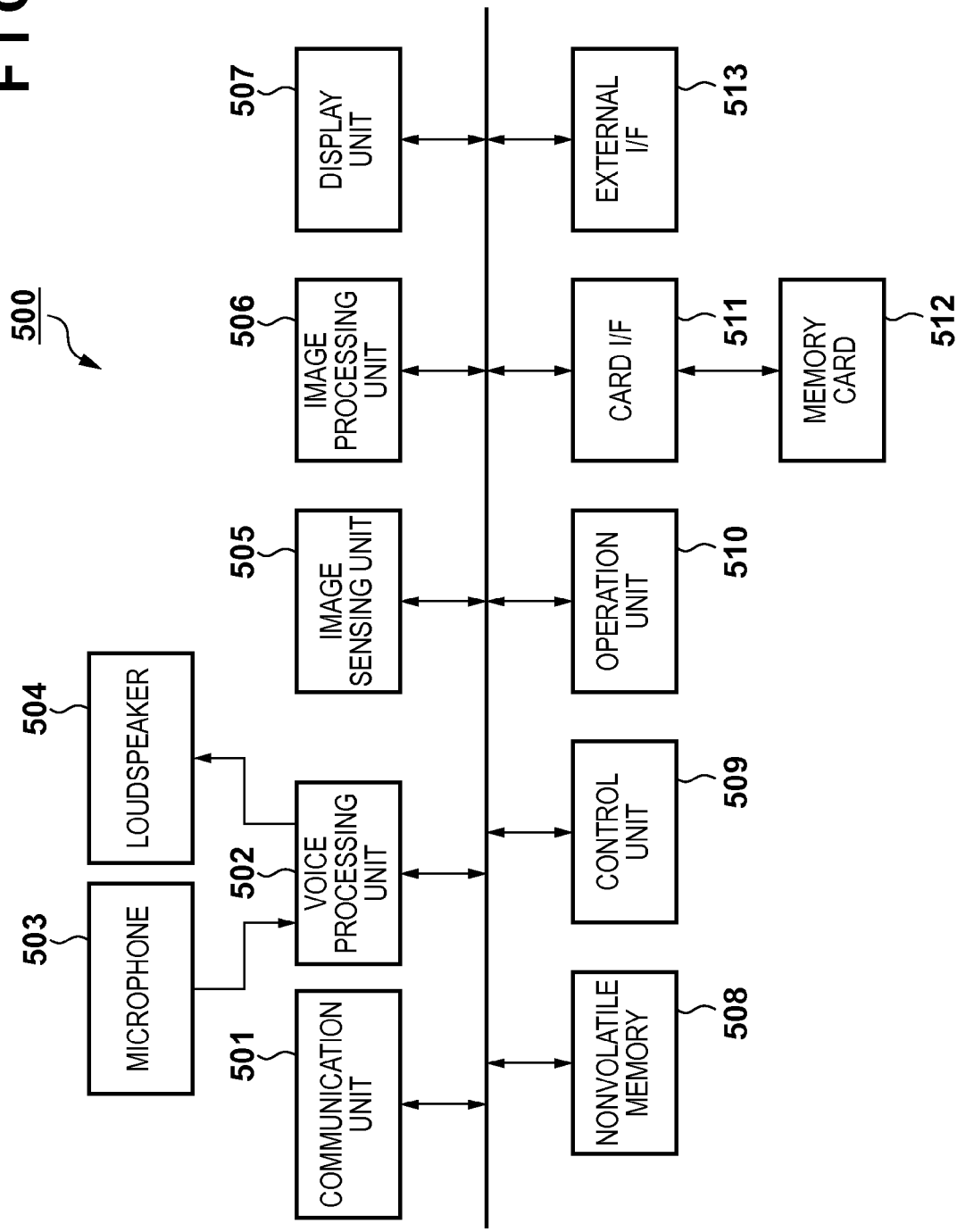
FIG. 8 a block diagram showing a schematic arrangement of a cellular phone according to a third embodiment.

FIG. 8 is a block diagram showing an arrangement of a cellular phone 500 according to the third embodiment of the present invention. The cellular phone 500 according to the third embodiment has the e-mail function, Internet connection function, image shooting/playback function, and the like, in addition to the voice communication function.

In FIG. 8, a communication unit 501 communicates voice data and image data with another phone by a communication method complying with a communication carrier with which the user has a contract. In voice communication, a voice processing unit 502 converts voice data from a microphone 503 into a format suited for origination, and sends the converted data to the communication unit 501. Also, the voice processing unit 502 decodes voice data from a call destination that has been sent from the communication unit 501, and sends the decoded data to a loudspeaker 504.

An image sensing unit 505 includes the image sensor described in one of the first and second embodiments, shoots an image of an object, and outputs image data. At the time of shooting an image, an image processing unit 506 processes image data shot by the image sensing unit 505, converts the data into a format suited for recording, and outputs the converted data. At the time of playing back a recorded image, the image processing unit 506 processes the image to be played back, and sends the processed image to a display unit 507. The display unit 507 includes a liquid crystal display panel about several inches in size, and displays various display contents in accordance with instructions from a control unit 509. A nonvolatile memory 508 stores information of an address book, and data such as data of e-mail and image data shot by the image sensing unit 505.

The control unit 509 includes a CPU and memory, and controls the respective units of the cellular phone 500 in accordance with a control program stored in the memory (not shown). An operation unit 510 includes a power button, number keys, and various other operation keys used to input data by the user. A card I/F 511 records and reads out various data on and from a memory card 512. An external I/F 513 transmits, to an external device, data stored in the nonvolatile memory 508 and memory card 512, and receives data transmitted from an external device. The external I/F 513 performs communication by a well-known communication method such as wireless communication or a wired communication method conforming to, for example, a USB standard.

Next, the voice communication function in the cellular phone 500 will be explained. When calling a call destination, the user operates the number keys of the operation unit 510 to input the number of the call destination, or operates to display, on the display unit 507, an address book stored in the nonvolatile memory 508, selects the call destination, and instructs origination. When the origination is instructed, the control unit 509 originates a call to the call destination via the communication unit 501. If the call destination answers the call, the communication unit 501 outputs voice data of the destination to the voice processing unit 502, and also transmits voice data of the user to the destination.

When transmitting an e-mail, the user instructs creation of a mail by using the operation unit 510. When the creation of a mail is instructed, the control unit 509 displays a mail creation screen on the display unit 507. The user inputs a transmission destination address and body by using the operation unit 510, and instructs transmission. When transmission of the mail is instructed, the control unit 509 sends address information and data of the mail body to the communication unit 501. The communication unit 501 converts the mail data into a format suited for communication, and sends the converted data to the transmission destination. When the communication unit 501 receives an e-mail, it converts the received mail data into a format suited for display, and displays the converted data on the display unit 507.

Next, the image shooting function in the cellular phone 500 will be explained. When the user operates the operation unit 510 to set the shooting mode and then instructs shooting of a still image or moving image, the image sensing unit 505 performs shooting and sends the shot still image data or moving image data to the image processing unit 506. The image processing unit 506 processes the shot still image data or moving image data, and stores the processed data in the nonvolatile memory 508. The image processing unit 506 sends the obtained still image data or moving image data to the card I/F 511. The card I/F 511 stores the still image data or moving image data in the memory card 512.

The cellular phone 500 can transmit, as a file attached to an e-mail, a file including still image data or moving image data shot in this manner. More specifically, when transmitting an e-mail, an image file stored in the nonvolatile memory 508 or memory card 512 is selected, and transmission of the image file as an attached file is instructed.

The cellular phone 500 can also transmit a file including shot still image data or moving image data to an external device such as a PC or another phone via the external I/F 513. The user selects an image file stored in the nonvolatile memory 508 or memory card 512 and instructs transmission, by operating the operation unit 510. The control unit 509 controls to read out the selected image file from the nonvolatile memory 508 or memory card 512, and controls the external I/F 513 to transmit the readout image file to the external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-249626, filed on Dec. 2, 2013, and No. 2014-223195 filed Oct. 31, 2014, which are hereby incorporated by reference herein in their entirety.

What is claimed is:

1. An image sensor comprising:
    a plurality of pixels including a first pixel group and a second pixel group;
    a first readout unit connected to the first pixel group;
    a second readout unit connected to the second pixel group; and
    a control unit configured to control to supply power to the first and second readout units in a first readout mode, and control to supply power to the first readout unit and not to supply power to the second readout unit in a second readout mode,
    wherein the plurality of pixels and the first readout unit are arranged on a first chip, and the second readout unit is arranged on a second chip.

2. The image sensor according to claim 1, wherein, in the first readout mode, all of the plurality of pixels are read out, and in the second readout mode, part of the plurality of pixels are thinned out and a rest of the plurality of pixels are read out.

3. The image sensor according to claim 2, wherein the second pixel group is configured with the pixels to be thinned out in the second readout mode.

4. The image sensor according to claim 2, wherein the first pixel group includes all the pixels to be read out in the second readout mode.

5. The image sensor according to claim 1, wherein the first readout unit includes a plurality of first column readout units respectively provided for columns to which the first readout unit is connected, and one or more first horizontal scanning units configured to control the plurality of first column readout units, and
    the second readout unit includes a plurality of second column readout units respectively provided for columns to which the second readout unit is connected, and one or more second horizontal scanning unit configured to control the plurality of second column readout units.

6. The image sensor according to claim 5, wherein the plurality of first column readout units and the first horizontal scanning units are respectively divided into two groups, and respectively arranged on two end portions of the columns of the plurality of pixels.

7. The image sensor according to claim 5, wherein the plurality of second column readout units and the second horizontal scanning units are divided into two groups, and respectively arranged on two end portions of the columns of the plurality of pixels.

8. The image sensor according to claim 1, wherein the first chip and the second chip are stacked on each other.

9. An image capturing apparatus comprising:
    an image sensor including:
        a plurality of pixels including a first pixel group and a second pixel group;
        a first readout unit connected to the first pixel group;
        a second readout unit connected to the second pixel group; and
        a control unit configured to control to supply power to the first and second readout units in a first readout mode, and control to supply power to the first readout unit and not to supply power to the second readout unit in a second readout mode, wherein the plurality of pixels and the first readout unit are arranged on a first chip, and the second readout unit is arranged on a second chip.

10. A cellular phone comprising: an image sensor including: a plurality of pixels including a first pixel group and a second pixel a first readout unit connected to the first pixel group; a second readout unit connected to the second pixel group; and a control unit configured to control to supply power to the first and second readout units in a first readout mode, and control to supply power to the first readout unit and not to supply power to the second readout unit in a second readout mode, wherein the plurality of pixels and the first readout unit are arranged on a first chip, and the second readout unit is arranged on a second chip.

* * * * *